W. H. Rodgers.
Measuring Funnel.
No. 69,129.        Patented Sep. 24, 1867.
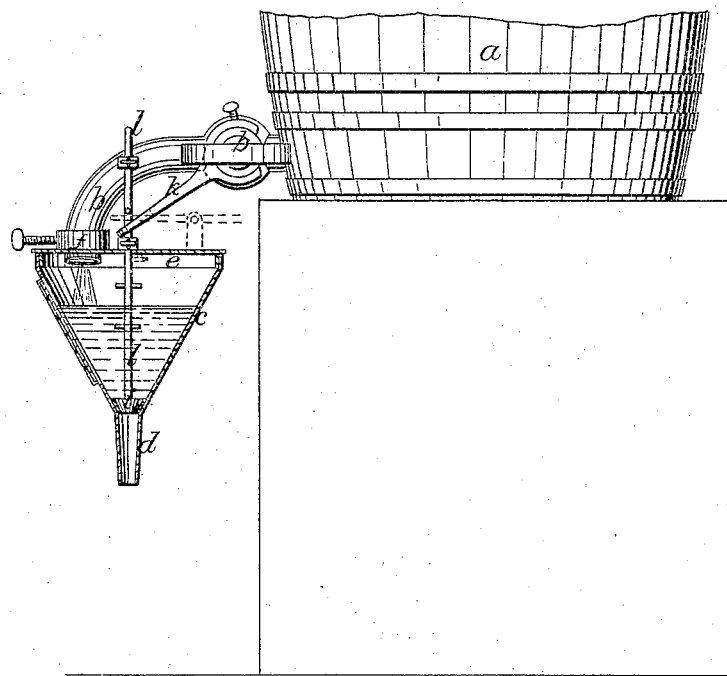
Witnesses:
Chas. H. Smith
Geo. D. Walker
Inventor:
Wm. H. Rodgers

United States Patent Office.

WILLIAM H. RODGERS, OF BROOKLYN, NEW YORK.

Letters Patent No. 69,129, dated September 24, 1867.

---

IMPROVEMENT IN MEASURING-FUNNELS.

---

The Schedule referred to in these Letters Patent and making part of the same.

---

TO ALL WHOM IT MAY CONCERN:

Be it known that I, WILLIAM H. RODGERS, of Brooklyn, E. D., in the county of Kings, and State of New York, have invented, made, and applied to use a certain new and useful Improvement in Measure and Funnel combined; and I do hereby declare the following to be a full, clear, and exact description of the said invention, reference being had to the annexed drawing, making part of this specification, in which I have shown a vertical section of said combined measure and funnel.

Heretofore a measure has been made with a funnel-nose, and a faucet has been combined with a measure placed above the cock, the measure being supplied by turning the cock one way, and allowed to empty by turning the cock the other way.

The nature of my said invention consists in a funnel, that is provided with a cover and a clamp for attaching it to the faucet, in combination with a valve for closing the exit of the funnel while measuring the liquid in the said funnel.

By this construction the measure and funnel can be permanently attached to any ordinary cock or faucet, and the measure will always be in place and covered up so as to exclude insects, dust, or dirt, and all that is required is to turn the cock for supplying the liquid into the measure, and then opening the valve to allow it to run out into any receiving vessel. I attach a lever to the cock so that it shall act to open the valve as the cock is closed.

In the drawing $a$ represents a part of a barrel or other vessel holding the liquid to be measured. $b$ is a faucet or cock of any desired character. $c$ is my measure, of any desired size and shape, but in the form of a funnel at the bottom, with the tapering tube $d$. $e$ is the cover of the measure $c$, secured thereto by bayonet slots and pins or other locking device. $f$ is a ring large enough to receive the end of the bib, having a clamping screw and being permanently attached to the cover $e$. The side of the measure is made transparent by the introduction of a strip of glass, and cross-bars at this point denote the different measures. A valve, $i$, is applied at the bottom of the measure or funnel, to close the pipe $d$ when measuring the liquid, and this valve is opened by a rod, $l$, acted upon by a lever-arm, $k$, from the plug of the cock $b$, so as to lift the valve $i$ as the cock is shut, or a lever might be employed on the measure and operated by hand to raise this valve $i$. This lever is shown by dotted lines.

This combined measure and funnel is durable, cleanly, and particularly available in measuring liquors, wines, beer, and oils. It can be easily applied to any faucet, and is always in position for use.

What I claim, and desire to secure by Letters Patent, is—

The cover and clamp to attach to a faucet, in combination with the measure and funnel, provided with a valve, as and for the purposes specified.

In combination with said measure and valve, I claim the lever $k$, connected to the cock for raising the valve $i$, as set forth.

In witness whereof I have hereunto set my signature this seventh day of February, 1867.

WM. H. RODGERS.

Witnesses:
GEO. D. WALKER,
CHAS. H. SMITH.